Jan. 14, 1969 H. A. FULTON ET AL 3,421,540
SINGLE LEVER FAUCET CONSTRUCTION

Filed Oct. 4, 1966 Sheet 1 of 3

INVENTORS
HOWARD A. FULTON,
VAUGHN D. FLINNER &
RICHARD W. SPRANG

Hamilton & Cook
ATTORNEYS

INVENTORS
HOWARD A. FULTON,
VAUGHN D. FLINNER &
RICHARD W. SPRANG

*Hamilton & Cook*
ATTORNEYS

INVENTORS
HOWARD A. FULTON,
VAUGHN D. FLINNER &
RICHARD W. SPRANG

*Hamilton & Cook*
ATTORNEYS

United States Patent Office 3,421,540
Patented Jan. 14, 1969

3,421,540
SINGLE LEVER FAUCET CONSTRUCTION
Howard A. Fulton, Perrysville, and Vaughn D. Flinner and Richard W. Sprang, Big Prairie, Ohio,, assignors to Mansfield Sanitary Inc., Perrysville, Ohio, a corporation of Ohio
Filed Oct. 4, 1966, Ser. No. 584,172
U.S. Cl. 137—454.6                          10 Claims
Int. Cl. F16k 25/00; F16k 51/00

The invention relates generally to water faucets and more particularly to faucets having a single lever for turning the water on and off and for regulating the mixture of the hot and cold water.

This type of faucet is well known, and utilizes the up and down movement of the lever for opening and closing the faucet valve, the mixture being regulated by rotating the lever on the upright axis of the faucet. However, prior single lever faucets have embodied a considerable number of parts, making them expensive to manufacture and assemble.

Moreover, the installation and repair of such prior single lever faucets has required the services of a plumber or skilled workman. Thus, the replacement of a worn gasket or washer has often required a service call by the plumber, which in these days of high labor rates is an expensive proposition.

It is an object of the present invention to provide a simple and inexpensive single lever faucet construction having a minimum number of parts which are easily assembled, installed and removed.

The improved construction has a housing which slips into the usual shroud or escutcheon plate for quick connection with the water supply pipes, and a cartridge embodying the whole valve assembly is removably mounted in the housing and held in position by a screw cap which also mounts the single lever handle.

It is another object of the present invention to provide a unique valve assembly cartridge which is easily inserted in or removed as a unit from the faucet housing by an unskilled person without special tools.

A further object is to provide improved connection means in the cartridge between the valving plate and the valve stem guide, whereby those parts can be quickly connected and disconnected when the cartridge is removed from the housing.

Another object is to provide an improved reinforced valve seating plate cooperating with the hot and cold water valves to maintain liquid-tight seals over long periods of use.

A still further object is to provide an improved single lever faucet having a housing constructed and arranged to make a watertight connection with the water supply pipes without requiring a soldering or metal heating operation.

These and other objects are accomplished by the improvements comprising the present invention, a preferred embodiment of which is illustrated by way of example in the accompanying drawings and described in detail in the specification. Various modifications and changes in details of construction are encompassed within the scope of the appended claims.

Figure 6:
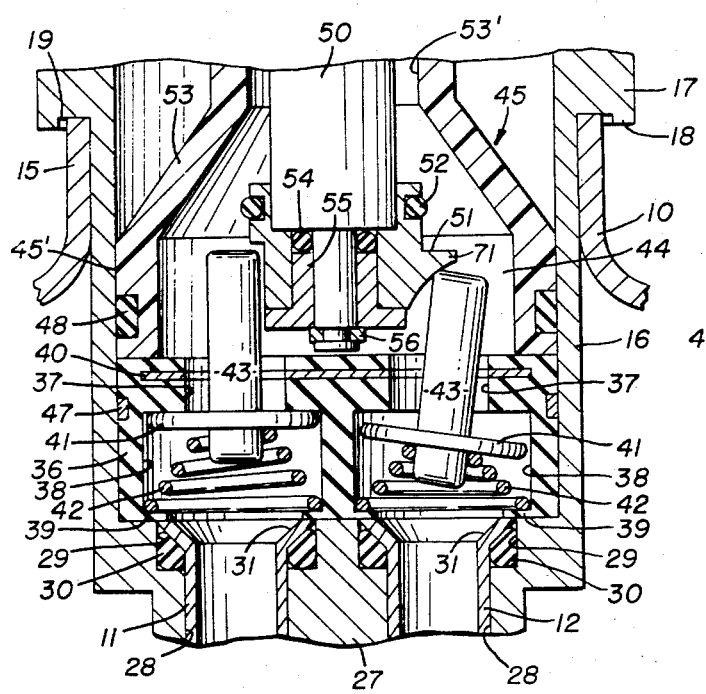

FIG. 6. is a similar view showing one valve closed and the other open.

Figure 7:
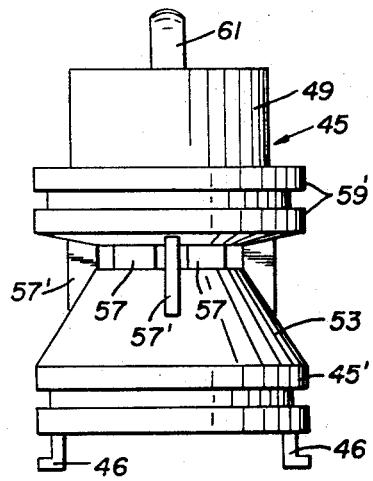

FIG. 7 is a detached elevational view of the stem guide and holddown member of the cartridge with the valve actuator stem therein.

Figure 8:
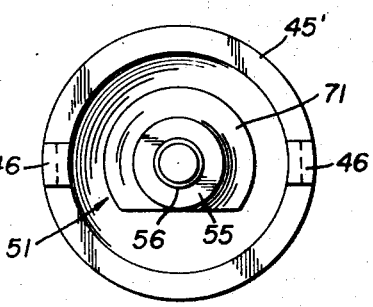

FIG. 8 is a bottom plan view thereof.

Referring to the drawings, a shroud or escutcheon member 10 is provided for covering the ends of hot and cold water supply pipes 11 and 12 which extend upwardly through the back portion of a wash bowl or sink (not shown). The bottom of shroud 10 is adapted to abut the top of the wash bowl or sink, and has internal bosses 13 for receiving clamping bolts 14 for mounting the shroud in a usual manner. The top of the shroud has a circular rim flange 15 forming an opening through which the faucet housing 16 extends.

The housing 16 has an upper radially enlarged portion 17 forming a shoulder 18 which rests on the rim flange 15, and may have a shallow groove 19 into which the flange 15 fits. A radially extending block 20 is formed at the rear of portion 17, and an actuating rod 21 has a finger piece 22 at its upper end and extends slidably through block 20 for connection at its lower end with the usual drain valve (not shown) of the wash bowl or sink.

At the front of the housing opposite to boss 20 a spout 23 is formed which is preferably inclined upwardly, and has screwed into its outer end a conventional water aerator 24. The inner end of the spout communicates with the interior of the housing through a port 25.

The bottom end of the housing 16 has a reduced boss 27 having two side-by-side bores 28 therethrough which receive the hot and cold water supply tubes 11 and 12. The upper ends of the bores have sockets 29 formed therein for receiving O-rings 30, and the O-rings abut the flared upper ends 31 of the supply tubes 11 and 12 to form watertight seals around the tubes. The bottom of the housing 16 adjacent to boss 27 is secured to interior flanges 32 and 33 on the shroud by screws 34.

In the bottom of the housing 16 is a seating block 36 having upper valve ports 37 communicating with valve chambers 38 forming through passageways which in turn communicate with the inlet tubes 11 and 12. Around the lower ends of the valve chambers the block 36 has flange portions 39 which abut the upper flared ends 31 to hold them in watertight abutment with O-rings 30. Preferably, a metal reinforcement plate 40 is encapsulated in the upper wall of the seating block 36 to keep it in flat horizontal position.

Disk valves 41 are positioned in valve chambers 38 and are urged by springs 42 into sealing abutment against valve seats formed in block 36 at the undersides of ports 37. Conventional dirt screens (not shown) may be attached to the face of springs 42 so as to be removable therewith. The flange portions 39 of the block extend under springs 42 so that the whole valve assembly can be removed with the block. Valve pins 43 extend upwardly from the disks 41 through the ports 37 into a mixing chamber 44 formed in the lower end of a stem guide and hold-down member indicated generally at 45 which abuts the top of block 36.

The member 45 is secured to block 36 so as to be removable therewith as a cartridge and preferably this is done by providing the bottom of member 45 with depending fingers 46 extending into slots in the top of block 16 and secured thereto by a snap ring 47. An O-ring 48 provides a seal between cylindrical base portion 45' of member 45 and the inside surface of housing 16.

Figure 1:
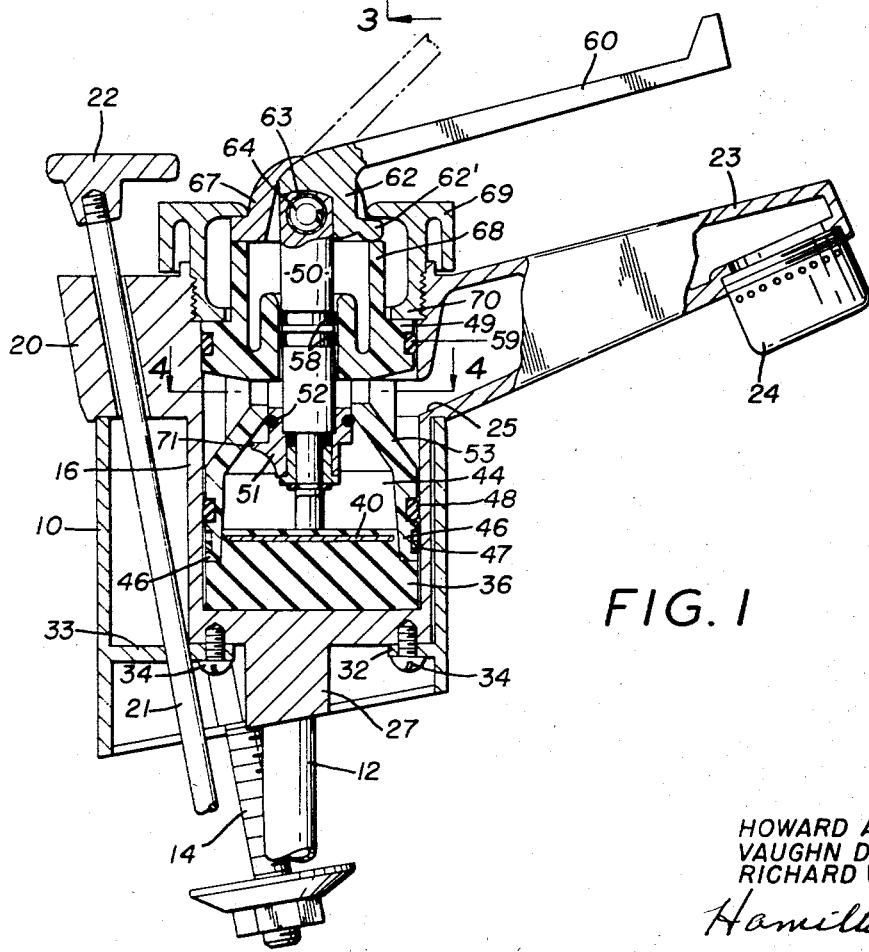
FIG. 1 is a side elevation, partly broken away and in section, of a single lever faucet according to the invention in operating position.
Figure 3:
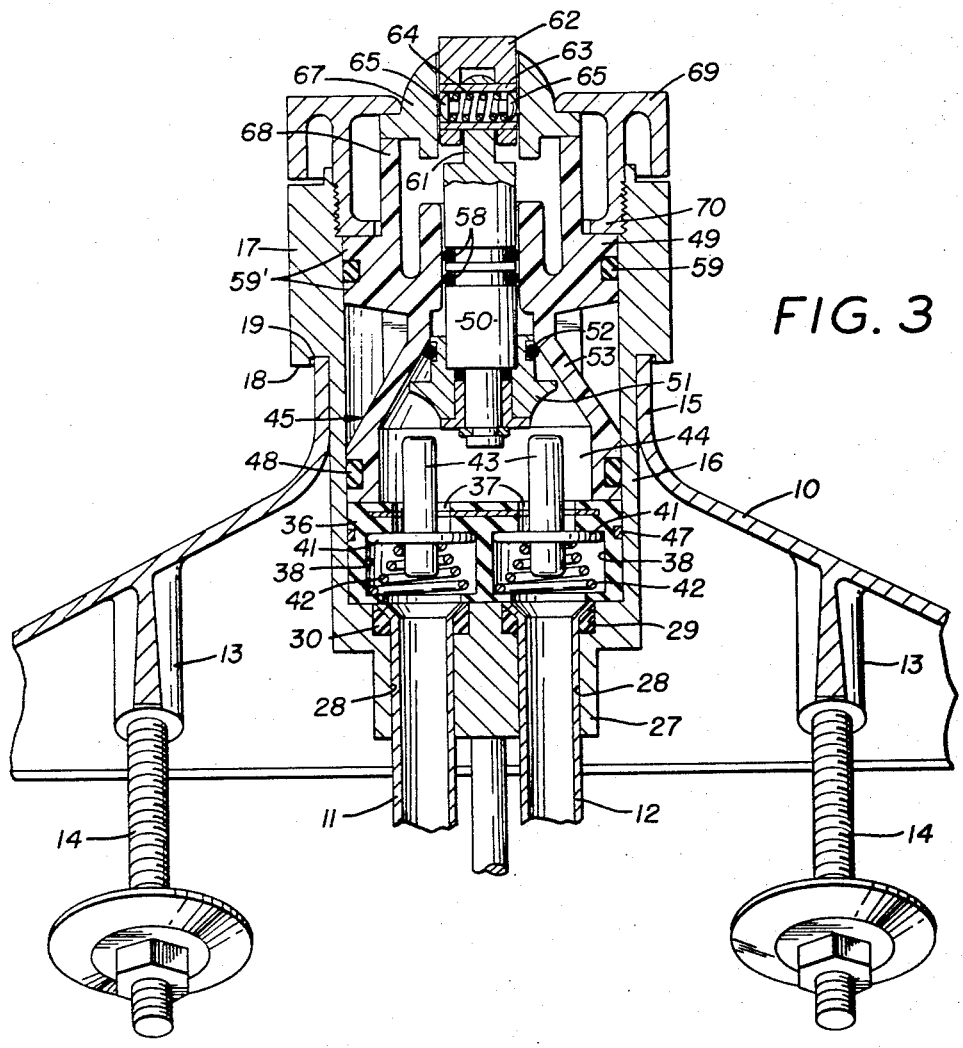
FIG. 3 is an enlarged vertical sectional view as on line 3—3, FIG. 1, showing the hot and cold water valves in closed position.

An actuator stem 50 extends slidably through a bore in the upper portion 49 of stem guide member 45, the lower end of said stem having a cam 51 thereon within the chamber 44. The upper part of cam 51 has a seating ring 52 thereon which seats against the inclined wall 53 having an opening 53' at the upper end of chamber 44. The seating ring 52 closes the opening 53' in the raised position of the stem 50, as shown in FIGS. 1 and 3, to close off water from the spout should leakage occur at the disk valves 41.

Figure 4:
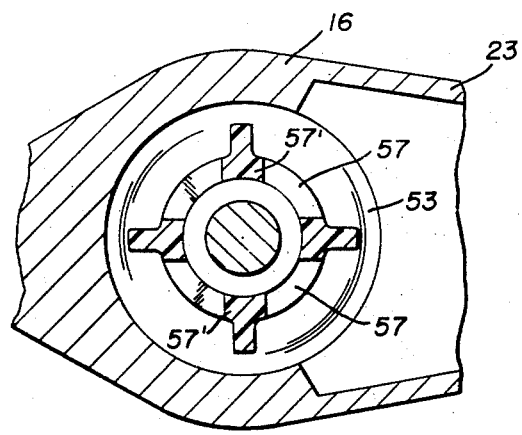
FIG. 4 is a cross-sectional view on line 4—4 of FIG. 1.

Preferably, the cam 51 is removable from stem 50 and an O-ring seal 54 is provided between the stem and the cam and held in position by an abutment sleeve 55 and snap ring 56. Above the opening 53' the stem guide is provided with lateral ports 57 formed between vertical ribs 57' (FIG. 4) for providing communication between mixing chamber 44 and spout opening 25 when the stem 50 is lowered. O-ring seals 58 are provided between the stem 50 and the upper portion 49 of the stem guide, and an O-ring seal 59 is provided between the housing and annular ribs 49' on portion 49 of the stem guide. The frictional engagement between O-rings 58 and stem guide 49 tends to hold stem 50 in any adjusted position.

A lever handle 60 is pivoted to the upper flatted end 61 of stem 50. The inner end of handle 60 has a clevis portion 62 fitting over the end 61 of the stem and is swiveled thereon by a pivot sleeve 63 extending through stem end 61 and clevis 62. Within the sleeve a compression spring 64 may be provided for urging end buttons 65 outwardly in abutment with the surfaces of a slot 66 in mounting head 67 in which clevis 62 is rotatable. The head 67 abuts a cylindrical flange 68 in guide portion 49, and is held in place by mounting cap 69 which is screwed into portion 17 of the housing and also has a base flange 70 which holds the member 49 in abutment with seating block 36 in the bottom of the housing. The clevis 62 has a pivot foot portion 62' abutting the flange 68.

The abutment of spring-urged buttons 65 with the surfaces of the slot 66 yieldingly holds the handle lever 60 in whatever pivoted position it is placed manually to control the opening and closing of the seating ring 52 with respect to the valve opening 53' formed at the top of wall 53 of the guide member 45.

Figure 5:
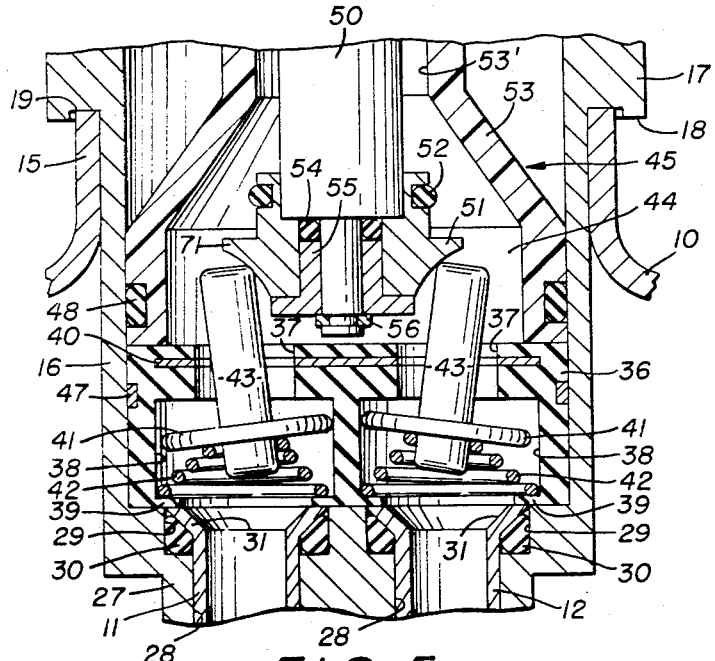
FIG. 5 is an enlarged partial view similar to FIG. 3 showing both the valves in an equally open position.

The lower part of cam member 51 has an arcuate cam portion 71 which is upwardly outwardly inclined and adapted in lowered position to tilt one or the other or both of the valve pins 43 depending upon the axial rotated position of the valve stem 50, which is determined by the position of lever handle 60 as rotated on the stem axis. With the handle in the full line rotative position in FIG. 2, when the handle is raised to lower the stem as in FIG. 5, the cam portion 71 engages both valve pins 43 and tilts them, opening ports 37 like amounts and both cold and hot water are admitted to mixing chamber 44 in substantially equal amounts and the mixture conducted to spout 23, the volume admitted depending upon the amount of tilt, which in turn is regulated by the vertical position of the cam 71 as controlled by upward pivotal movement of the handle 60.

Figure 2:
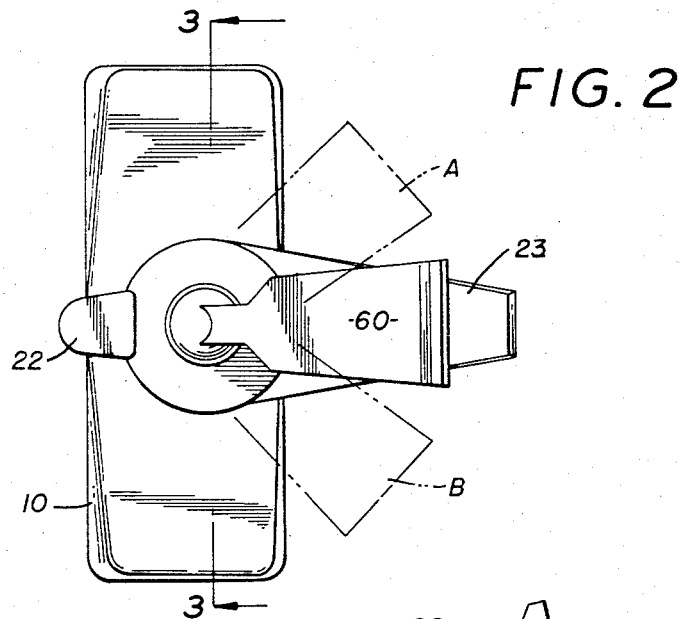
FIG. 2 is a top plan view thereof on a reduced scale.

If the handle is rotated to position A in FIG. 2, only valve pin for cold water supply pipe 12 is tilted and the hot water is shut off by the other valve 41. In position B the cold water would be shut off and the hot water open. Between the positions A and B are an infinite number of positions giving varying mixtures of hot and cold water as desired, and for each mixture the flow to the spout is nicely controlled by the vertical movement of the handle 60.

In all closed positions of the valves the reinforcement plate 40 maintains the upper wall of block 36 in a flat condition so as to insure a watertight seal between the wall and the valve disks 41 in chambers 38.

When it is desired to clean the inner parts of the improved faucet or to replace any worn parts, all that is necessary is to unscrew the cap 69 from the housing 16, whereupon the whole cartridge, comprising the handle 60, stem 50, cam 51, stem guide 45, and the valve assembly contained in seating block 36, can be lifted out as a unit. After removal of the cartridge, the valve assembly can be easily detached by removal of snap ring 47.

It will be seen from the foregoing description that a simple, compact and inexpensive single lever faucet construction has been provided which is extremely easy to install and remove, and which greatly facilitates the replacement of worn or non-functioning parts.

What is claimed is:

1. A single lever faucet comprising a housing having a bottom wall with water inlets therein, a valve assembly cartridge comprising a resilient valve block seated on said bottom wall and having through passageways communicating with said water inlets, a stem guide member having a bottom rim abutting said valve block and forming a mixing chamber above said block, tiltable valve elements in said passageways for normally closing off flow therethrough and having portions projecting into said mixing chamber, a stem rotatably and slidably mounted in said stem guide member and extending into said mixing chamber, a cam on said stem for selectively actuating said tiltable valve elements, said valve block, tiltable valve elements and stem guide member being detachably secured together for removal as a cartridge unit from the housing.

2. A single lever faucet as defined in claim 1 in which the water inlets in the housing bottom wall are tubular sockets having O-rings seated therein for sealing against the flared upper ends of water supply tubes passing through the water inlets.

3. A single lever faucet as defined in claim 1 having springs normally closing said valve elements, said springs removable with said valve block as part of said cartridge.

4. A single lever faucet as defined in claim 1 having a cap secured to said housing and a lever operatively connected to said valve stem and mounted in said cap.

5. A single lever faucet as defined in claim 1 in which the stem guide member has depending fingers detachably engaged with said valve block.

6. A single lever faucet as defined in claim 2 in which the depending fingers extend into the valve block and are detachably secured thereto by a spring ring.

7. A single lever faucet as defined in claim 2, having springs normally closing said tiltable valve elements, said springs removable with said valve block as part of said cartridge.

8. A single lever faucet as defined in claim 3 having a cap secured to said housing and a lever operatively connected to said valve stem and mounted in said cap.

9. A single lever faucet as defined in claim 6 having a cap secured to said housing and a lever operatively connected to said valve stem and mounted in said cap.

10. A single lever faucet as defined in claim 8 having springs normally closing said tiltable valve elements, said springs removable with said valve block as part of said cartridge.

References Cited

UNITED STATES PATENTS

| | | | |
|---|---|---|---|
| 2,923,315 | 2/1960 | Bletcher | 137—454.6 |
| 2,980,130 | 4/1961 | Harke | 137—636.4 X |
| 3,173,444 | 3/1965 | Bucknell | 137—636.4 X |
| 3,190,309 | 6/1965 | Staat | 137—636.4 X |

CLARENCE R. GORDON, *Primary Examiner.*